UNITED STATES PATENT OFFICE.

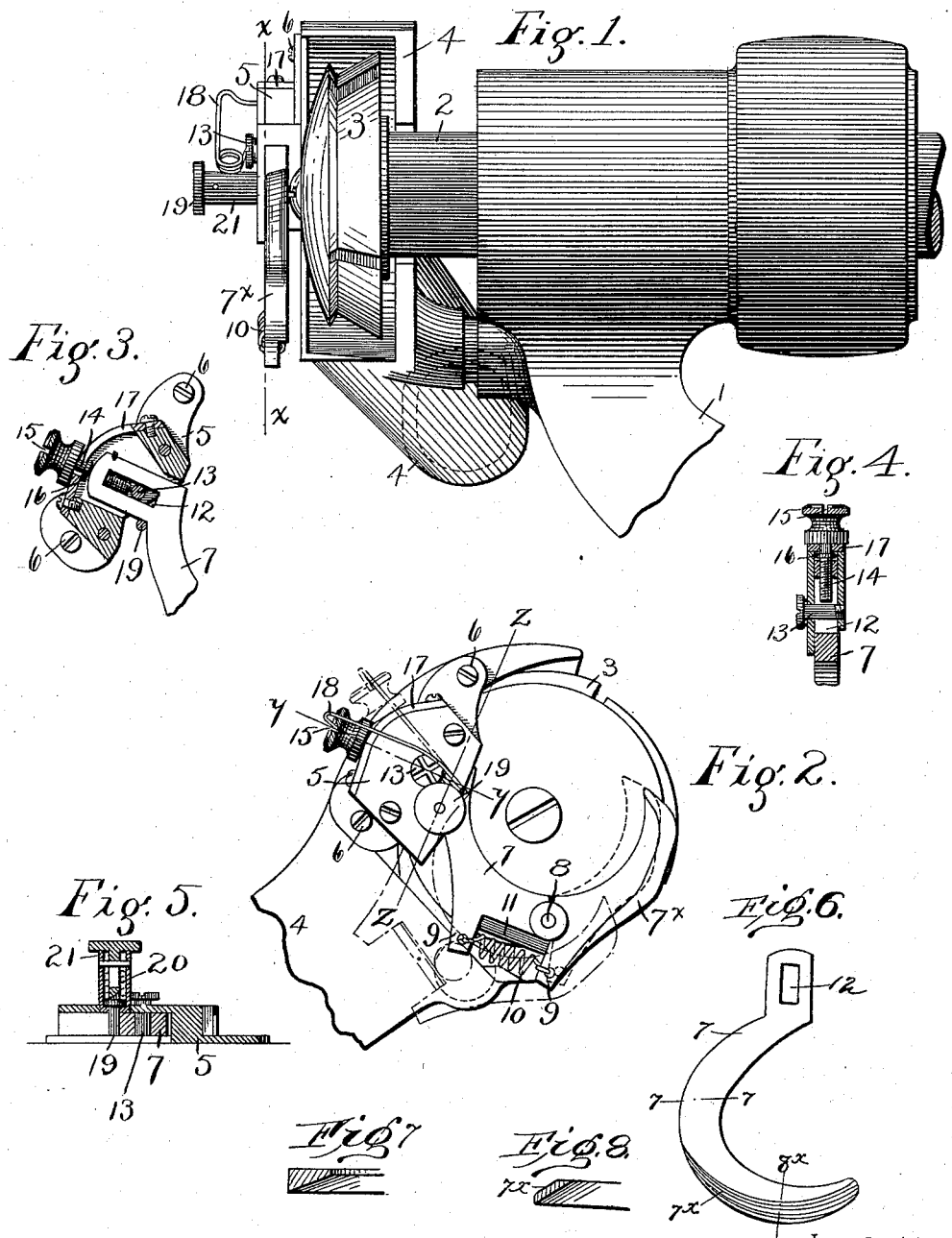

HENRY GRAVEN, OF ROCHESTER, NEW YORK.

GAGE FOR CUTTING AND TRIMMING MACHINES.

SPECIFICATION forming part of Letters Patent No. 609,199, dated August 16, 1898.

Application filed January 25, 1898. Serial No. 667,883. (No model.)

*To all whom it may concern:*

Be it known that I, HENRY GRAVEN, of Rochester, in the county of Monroe and State of New York, have invented certain new and useful Improvements in Gages for Cutting and Trimming Machines; and I do hereby declare the following to be a full, clear, and exact description of the same, reference being had to the accompanying drawings, forming a part of this specification, and to the reference-numerals marked thereon.

My present invention relates to shoe sole, heel, or rand trimming machinery, and has for its objects to provide an improved gage for the trimmer or cutter whereby the depth of the cut may be regulated to a nicety and whereby also the attachment may be readily removed from operative position when it is not desirable to use it; and to these and other ends the invention consists in certain improvements and combinations of parts, all as will be hereinafter fully described, and the novel features pointed out particularly in the claims at the end of this specification.

In the drawings, Figure 1 is a front elevation of a heel-trimming machine provided with my improvements; Fig. 2, an end elevation of the same; Fig. 3, a sectional view on the line $xx$ of Fig. 1; Fig. 4, a sectional view on the line $yy$ of Fig. 2; Fig. 5, a sectional view on the line $zz$ of Fig. 2; Fig. 6, a detail of a gage-arm for general work; Fig. 7, a sectional view on the line 7 7 of Fig. 6; Fig. 8, a similar view on the line 8 8 of Fig. 6.

Similar reference-numerals indicate similar parts.

My improved gage may be employed in connection with any desired type of rand, sole, or heel trimming machine; but I have for the purposes of illustration merely shown it in the drawings in connection with a rand-trimmer, of which 1 indicates the frame, 2 the shaft carrying the removable cutter or trimmer, and 3 and 4 the dust-hood or conduit, which for the purposes of showing the application of my invention constitutes a part of the machine-frame.

5 indicates the base or support of the gage attachment, secured by screws 6 or otherwise to the machine-frame and preferably in rear and above the cutter, said support having an aperture or recess therein, (extending in a plane at right angles to the cutter-shaft,) in which recess operates the rear end of the gage-arm. This gage-arm extends partly around the cutter and is preferably made in two parts 7 $7^\times$, pivoted together at 8 and having extensions 9 beyond the pivot connected by a spring 10, tending to keep the parts in the relative positions shown in full lines in Fig. 2 with the extensions against a suitable stop-pin 11; but the outer part $7^\times$ may by pressure upon it be turned on the pivot 8 to the position in dotted lines, for a purpose to be described. The front of the section $7^\times$ of the gage is tapered to an edge, as shown, which when the gage is in use engages the upper of the lasted shoe just above the crease or groove above the sole and heel, so as to bring the cutter in proper relation to the rand, heel, or sole, and the spring 10 is strong enough to hold the gage under ordinary circumstances, making it in effect a solid gage, so that the operator may press the shoe firmly against it and guide it properly to perform the necessary trimming operation. Sometimes—as, for instance, when the gage is used on a rand-trimmer—it is desirable that the cutter be permitted to enter deeper than the amount for which the gage is adjusted in order to trim the rand at the corner of a heel which is slightly narrowed at the breast, and this may be accomplished by the use of my device, as the gage-section $7^\times$ will yield against the tension of the spring 10 when the operator gives extra pressure on the shoe, and thereby allow the cutter to enter and trim the deeper parts, as will be understood.

In operating upon general work the solid gage-arm shown in Fig. 6 is the one generally used, and while the gage provided with the sectional arm shown in Fig. 1 is particularly adapted for work of special character it may be used in place of the solid arm with good results. The rear portion 7 of the gage-arm is provided with a longitudinal slot 12, through which passes the transverse pivotal pin 13, secured to the support, and the extreme end is provided with a threaded aperture in which operates an adjusting-screw 14, having an enlarged outer end or head transversely slotted on the outer end at 15. The under side of the head operates against the upper side of a slotted segmental plate 17 on the support, and beneath said head is a collar 16, operating against the lower side of said plate 17, as shown in Figs. 3 and 4. By the adjustment of this screw the outer edge of the gage may be adjusted relative to the cutter, and the plate guides it in its swinging movements in a circle of which the plate 17 is an arc. The swinging movement enables the gage to be moved from the position in full lines in Fig. 2 to the position in broken lines away from the trimmer-tool, so that the latter may be removed from or adjusted upon its shaft or for any other purpose desired, and the movement away from the cutter is preferably caused by a spring-arm 18, secured to the support and having its free end entered in the slot 15 in the head of the adjusting-screw 14, so that it performs, in addition, the function of a lock for said screw, preventing its accidental movement. The free end of the spring may be readily removed upwardly or laterally from the slot in the screw-head when desired to adjust the gage by the operation of the screw.

19 indicates a movable bolt or pin operated transversely of the path of movement of the gage by a spring 20, located in a suitable thimble 21, said bolt being adapted to spring beneath or behind the arm 7 and hold the gage elevated to operative position, as shown in Fig. 2, against the tension of the spring 18.

Should the operator desire to move the gage from the edge of the tool at any time, as for the purpose of removing or changing the cutter or to dispense with the gage, it is only necessary to pull out the pin 19 and allow the spring 18 to turn the gage to the position in broken lines out of the way, and when he desires to use the gage again he pulls it forward to operative position in full lines, where it is retained by the bolt, which springs behind it, as in Fig. 3. This gage I find very useful in practice, as it may be applied to the various machines on the market and enables the operator to work rapidly and produce more uniform work than with a machine unprovided with a gage, and, furthermore, he may throw the gage out of operative position for any purpose and readjust it when desired by a slight movement and without the employment of special tools.

I claim as my invention—

1. The combination with a rotary cutting-tool, of a gage embodying an arm extending partially around the cutter, and pivoted to turn at right angles to the axis of the cutter, a spring for operating the gage-arm away from the cutter, and a retaining device for holding the gage in operative position.

2. The combination with a rotary cutting-tool, of a gage embodying an arm extending partially around the cutter and pivoted to turn on a center parallel with the axis of the cutter, a spring for operating the gage away from the cutter, a retaining device, and means for adjusting the gage.

3. The combination with a rotary cutting-tool, of a gage consisting of the support, the movable arm thereon formed in two sections relatively movable, the spring for holding the outer section extended, and detachable securing devices for holding the gage as a whole in operative position with the outer yielding section in proximity to the cutter edge.

4. In a gage for rotary cutting-machines, the combination with the support, the slotted gage-arm adapted to extend partially around the cutter, the pin on the support extending through the slot, and the adjusting-screw engaging the support and gage-arm.

5. In a gage for rotary cutting-machines, the combination with the support, the gage-arm movable on the support and having its end projecting beyond the face of the cutter, an adjusting-screw for adjusting said arm, the spring engaging the screw to lock it and also operating to move the arm, and retaining devices for holding the arm against the tension of the spring.

6. In a gage for rotary cutting-machines, the combination with the support and the segmental slotted plate thereon, of the gage-arm, the screw engaging and passing through the slot in the segmental plate and entering the gage-arm, and also adjustable in the slot, and the pivot-pin on the support engaging the arm.

7. In a gage for a rotary cutter, the combination with the support, the segmental slotted plate thereon and the pivot-pin below it, of the gage-arm engaging the pivot-pin, the screw having the slotted head and engaging the plate and also the arm, the spring locking the screw and operating the gage-arm away from the cutter, and the spring-operated pin for holding the arm against the tension of the spring.

8. The combination with the rotary shaft and the removable cutter on the free end thereof, of an adjustable gage-arm partially encircling the outer edge and free end of the cutter and having its edge projecting beyond the periphery of the latter, said arm being pivoted on an axis parallel with that of the cutter-shaft and movable toward and from the cutter, and means for holding the gage over the edge of the cutter and permitting it to move back from the free end thereof to permit the removal of the cutter, when desired.

HENRY GRAVEN.

Witnesses:
  F. F. CHURCH,
  G. W. RICH.